United States Patent [19]

Jassby et al.

[11] 4,057,462

[45] Nov. 8, 1977

[54] RADIO FREQUENCY SUSTAINED ION ENERGY

[75] Inventors: Daniel L. Jassby; William M. Hooke, both of Princeton, N.J.

[73] Assignee: The United States of America as represented by the United States Energy Research and Development Administration, Washington, D.C.

[21] Appl. No.: 553,196

[22] Filed: Feb. 26, 1975

[51] Int. Cl.² .................... H01J 37/00; G21B 1/00
[52] U.S. Cl. .................................... 176/5; 315/111.7
[58] Field of Search ................... 176/1, 2, 3, 5, 7; 333/95 R, 99 PL; 313/231.3, 360–363; 315/111.1, 111.7

[56] References Cited

U.S. PATENT DOCUMENTS

| 2,567,260 | 9/1951 | Wiley | 343/873 |
| 3,411,112 | 11/1968 | Honig et al. | 333/95 |
| 3,663,361 | 5/1972 | Yoshikawa | 176/3 |
| 3,663,362 | 5/1972 | Stix | 176/2 |
| 3,663,858 | 5/1972 | Lisitano | 176/7 |
| 3,668,066 | 6/1972 | Hendel et al. | 176/7 |
| 3,713,967 | 1/1973 | Hamilton et al. | 176/3 |
| 3,742,219 | 6/1973 | Damm et al. | 176/5 |
| 3,886,402 | 5/1975 | Furth et al. | 315/111.7 |

OTHER PUBLICATIONS

Physics Today (11/75) p. 38, Kadomtsev et al.
Acronyms and Initialisms Dictionary, 4th Ed., Gale Research Co., p. 572, Crowley et al.
Technology Review (12/76) pp. 20–43.
*Plasmas and Controlled Fusion*, M.I.T. Press, Rose et al.; (8/9/61) pp. 426–432 and 453–461.
ORWL-4688 (8/71) pp. 44–66.
UWFDM-68, vol. 1 (10/20/73) pp. 1–10.
Matt-1029 (2/74) pp. 1–11.

*Primary Examiner*—Samuel W. Engle
*Assistant Examiner*—S. A. Cangialos
*Attorney, Agent, or Firm*—Dean E. Carlson; Leonard Belkin; C. Daniel Cornish

[57] ABSTRACT

Electromagnetic (E.M.) energy injection method and apparatus for producing and sustaining suprathermal ordered ions in a neutral, two-ion-species, toroidal, bulk equilibrium plasma. More particularly, the ions are produced and sustained in an ordered suprathermal state of existence above the average energy and velocity of the bulk equilibrium plasma by resonant rf energy injection in resonance with the natural frequency of one of the ion species. In one embodiment, the electromagnetic energy is injected to clamp the energy and velocity of one of the ion species so that the ion energy is increased, sustained, prolonged and continued in a suprathermal ordered state of existence containing appreciable stored energy that counteracts the slowing down effects of the bulk equilibrium plasma drag. Thus, selective deuteron absorption may be used for ion-tail creation by radio-frequency excitation alone. Also, the rf can be used to increase the fusion output of a two-component neutral injected plasma by selective heating of the injected deuterons.

1 Claim, 5 Drawing Figures (a) HORIZONTAL PLANE
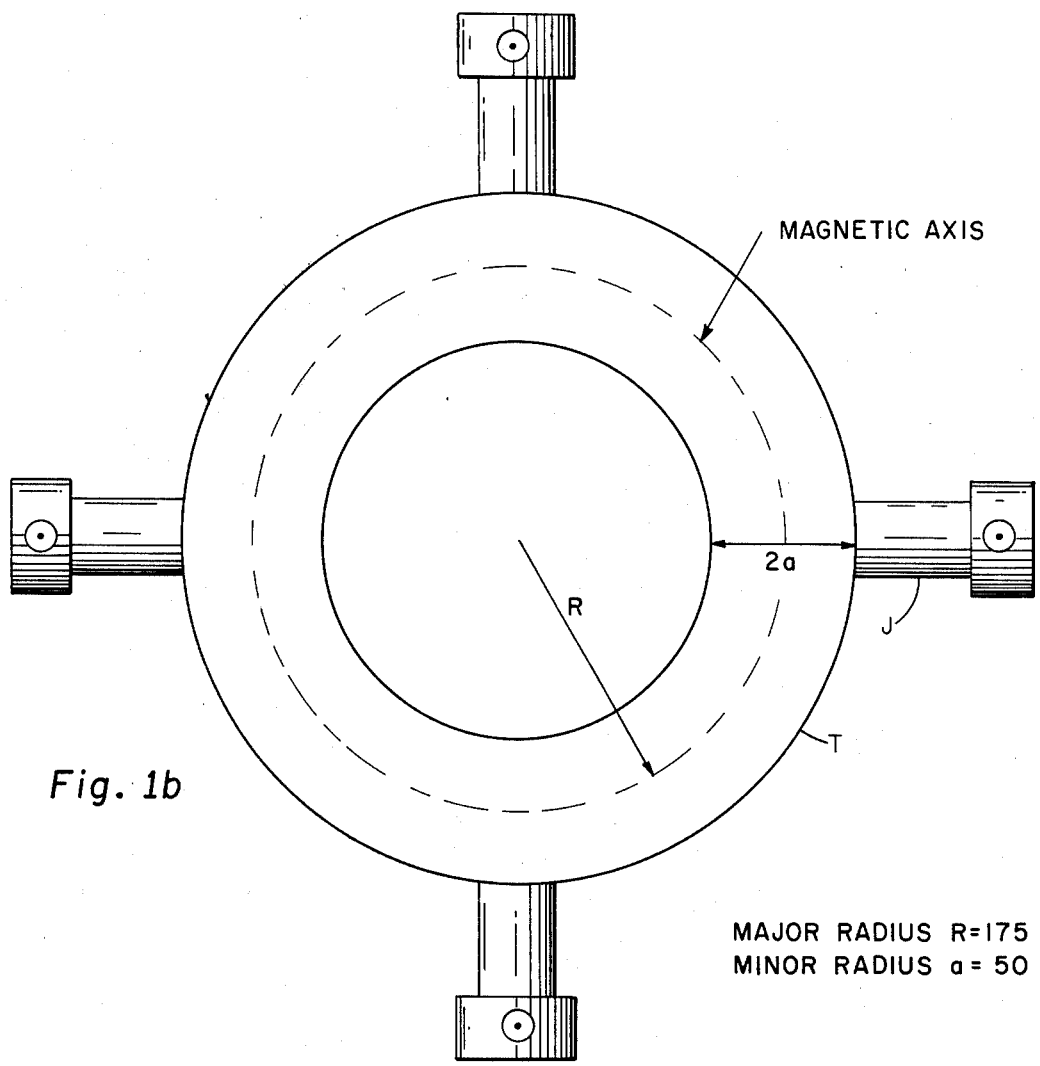
Fig. 1b
MAJOR RADIUS R=175 cm
MINOR RADIUS a = 50 cm
(b) VERTICAL PLANE
COAXIAL FEED FROM
75 MHz OSCILLATOR
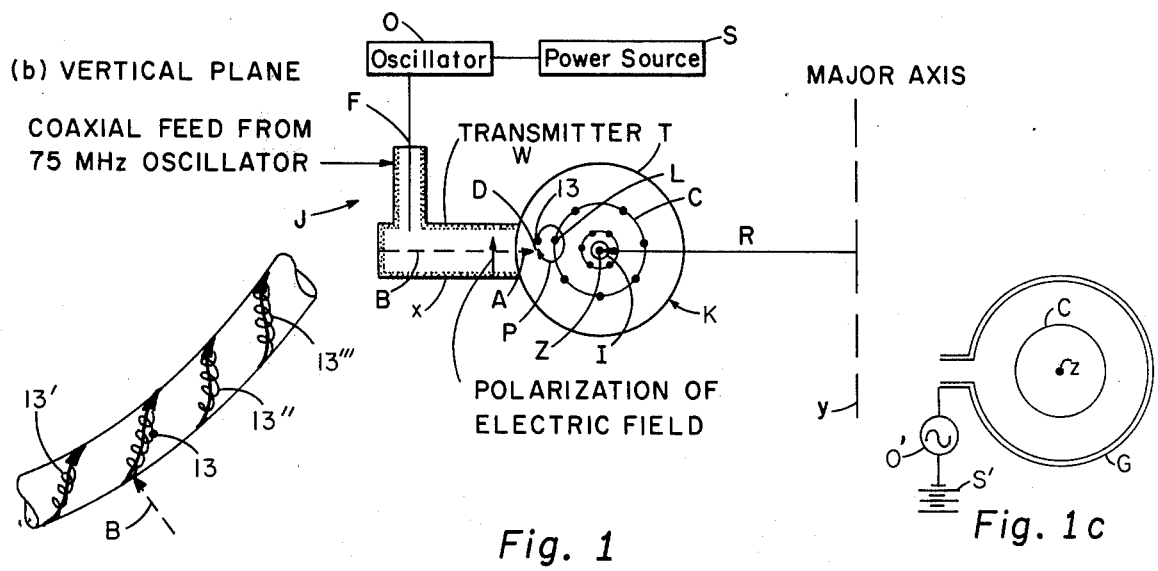
POLARIZATION OF
ELECTRIC FIELD
Fig. 1a
Fig. 1
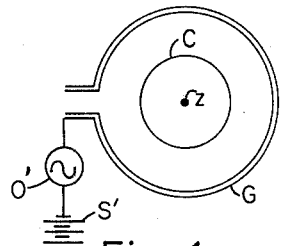
Fig. 1c

RADIO FREQUENCY SUSTAINED ION ENERGY

This invention was made in the course of, or under a contract with the U.S. Atomic Energy Commission.

BACKGROUND OF THE INVENTION

In the filed of plasma physics, a need exists for means and methods for producing suprathermal ordered ions having stored energy in a confining toroidal plasma column that is in equilibrium. This is because the suprathermal ordered ions can produce a net energy gain from fusion reactions in the bulk equilibrium plasma; also neutrons result that are useful in the numerous applications to which neutrons have heretofore been applied. One device for confining the plasma is the tokamak described in U.S. Pat. No. 3,702,163. The tokamak apparatus at Princeton University ohmically heats an ionized gas to produce a toroidal plasma column that is magnetically confined to produce a plasma having a charged particle number density of $10^{14}$ particles/cm$^3$, an electron temperature $T_3 = 1 - 2$ keV, an ion temperature $T_i = 0.6$ keV, and a confinement time of at least 20 - 25 msec. Also, it is desirable to sustain the energy of ordered suprathermal ions that are produced by injecting a neutral beam to increase the time the ions react with the bulk target plasma during the time the ions slow down in the bulk target plasma.

CROSS REFERENCE TO RELATED APPLICATIONS:

Application Ser. No. 649,949, filed Jan. 27, 1976, which is a Continuation of abandoned applicaton Ser. No. 411,503, filed Oct. 31, 1973, which is a Continuation of abandoned application Ser. No. 231,324, filed Mar. 2, 1972 entitled "Two-Component Toroidal Fusion Reactor With Sustained Suprathermal Ion Energy" by Furth and Jassby, is filed concurrently herewith.

SUMMARY OF THE INVENTION

It has been discovered in accordance with this invention that rf electromagnetic energy can be injected into a two-ion-species, neutral, toroidal, equilibrium, target plasma for producing and sustaining suprathermal ordered ions having a stored energy in the plasma. To this end, resonant rf energy is injected into a specific toroidal plasma column in a conventional tokamak at specific times, energies and frequencies, respectfully, by conventional apparatus. For example, in one embodiment the rf energy is injected into a tokamak at a harmonic of the ion-cyclotron frequency of deuterons in the confined, bulk, neutral, equilbrium target plasma of D + T for producing suprathermal ordered deuterons and for clamping the energy of the suprathermal ordered deuterons against the slowing down effects due to drag in the plasma. Thus, selective deuteron absorption may be used for ion-tail creation by radio frequency excitation alone, as an alternative to neutral injection. The rf can also be injected into an equilibrium two-ion-species target plasma containing suprathermal ions produced by neutral beam injection to sustain the stored energy of the suprathermal injected ions. With the proper selection of plasma and injection, as described in more detail hereinafter, the suprathermal ion energy is ordered and sustained as desired.

It is an object of this invention, therefore, to inject electromagnetic energy into a bulk equilibrium target plasma to produce suprathermal ordered ions.

It is another object to sustain the energy of suprathermal ordered ions in a bulk equilibrium plasma.

It is another object to increase the reaction time of ordered suprathermal ions having stored energy in a bulk equilibrium plasma.

The above and further novel features and objects of this invention will become apparent from the following detailed description of one embodiment when read in connection with the accompanying drawing, and the novel features will be particularly pointed out in the appended claims.

BRIEF DESCRIPTION OF THE DRAWINGS:

In the figures where like elements are referenced alike:

FIG. 1 is a partial cross-section of one embodiment of one electromagnetic injection system of this invention;

FIG. 1a is a partial three-dimensional view of the plasma column of FIG. 1 at three successive times;

FIG. 1b is a modification of the apparatus of FIG. 1 illustrating the location of four external rf energy sources;

FIG. 1c is another modification of the apparatus of FIG. 1;

DESCRIPTION OF A PREFERRED EMBODIMENT

Figure 2:
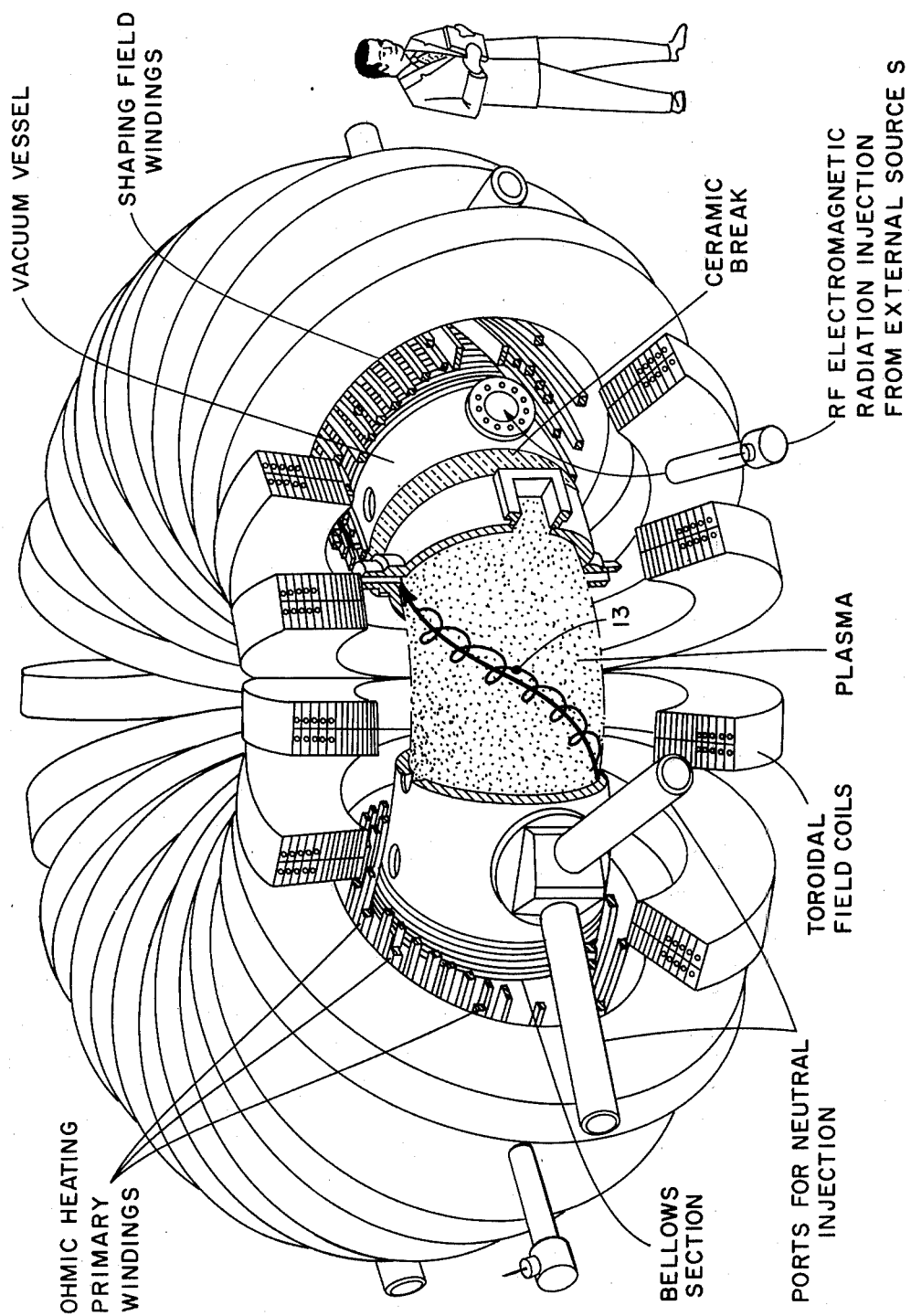
FIG. 2 is a partial three-dimensional view of still another modification of the apparatus of FIG. 1.

This invention is useful for ordering and storing energy in suprathermal ions in a two-ion-species, neutral, equilibrium plasma having a Maxwellian velocity distribution. As such, this invention provides a two-ion-component plasma that is useful for all the applications to which the two-component toroidal fusion reactors have been applied heretofore. One two-component plasma that can be confined in a closed toroidal magnetic field device, such as provided in a stellarator and a tokamak, is described in 26 Phys. Rev. Letters 1156 (10 May 1971). One two-ion-species plasma, comprises ions selected from deuterium, tritium or heavier particles, such as $^3$He nuclei. The apparatus and method of this invention are particularly useful for ordering ions in tokamaks containing plasma particle number densities up to $n = 10^{14}$ cm$^{-3}$ at high ion temperatures of over 0.5 keV, and electron temperatures of over 1 - 2 keV for confinement times of up to at least 20 - 25 msec or more in tokamaks, such as the ST, ATC and PLT at Princeton U., but this invention is useful in any of the stellarators or tokamaks known heretofore or planned for the future, such as the TCT planned at Princeton U., as will be understood by one skilled in the art.

It is known that suprathermal ordered ions can be magnetically confined in a tokamak in a toroidal equilibrium plasma column that is heated to high temperatures and confined stably at high densities in a vacuum container for relatively long periods of time by using two-component toroidal and poloidal magnetic fields that produce a nested set of concentric magnetic surfaces composed of helical equipotential magnetic field lines. A nested set of concentric magnetic surfaces for capturing, coupling and confining suprathermal ordered ions on helical magnetic field lines, which result from such two-component fields, is described on pages 65 - 75 of the July 1972 Scientific American and shown in the figure on page 65 of that article. Confinement is based on that fact that all the suprathermal ordered ions are captured and travel in a helical orbit encircling the helical magnetic field lines, and, as the captured ions spiral around the field lines, the spiraling ions produce fusion reactions or slow down, and no particle can move radially across the plasma column toward the vacuum container walls except as a result of a series of collisions with other particles, as shown in FIG. 2-1 of "Project Sherwood — The U.S. Program in Controlled Fusion", by Amasa Bishop, 1958, the mathematics of such particles, spirals and helical field lines being well known in the art. The invention hereinafter described utilizes such a system of toroidal and poloidal magnetic fields for producing this type of nested magnetic surfaces composed of helical field lines that do not close on themselves, i.e., that have shear from magnetic surface to magnetic surface, for confining a neutral, bulk, target, toroidal, equilibrium plasma column in which the outside of the plasma column in which the equilibrium ions are confined is subjected to resonating fields in a manner described below in connection with particular configurations of these two-component fields in tokamaks. A mathematical treatment of the principles involved in this invention is given in Princeton Plasma Physics Laboratory, Report MATT-1080, entitled, "Maximum Power Gains of Radio-Frequency Driven Two-Energy Component Tokamak Reactors" by D. L. Jassby. A further discussion of the selective deuteron absorption by radio-frequency alone, as an alternative to neutral injection is provided in Princeton U. Report MATT1113 by Thomas H. Stix.

In order to explain how the method and apparatus of this invention accomplish the function of sustaining or increasing the energy of the above-described suprathermal magnetically confined plasma ions, it will be understood from the above described confinement in a tokamak that the confined ions cannot be moved radially in the described arrangement, but they can be moved in an axial direction while they spiral along the helical magnetic field lines at their natural ion cyclotron resonance frequency. This is known from U.S. Pat. No. 3,052,614. Likewise, it is known from U.S. Pat. No. 3,015,618 to Stix that resonating rf energy can be transferred to the plasma resonance known as the ion cyclotron resonance of specific plasma ions. In this regard, reference is made to FIG. 1, wherein is illustrated helical field lines which spiral around an endless plasma current I in a vacuum tight torus T having an equilibrium axis Z, which is symmetric around an axis of rotation Y at the center of the annulus formed by a conventional, neutral, two-ion-species plasma column C and at right angles to the plane of the equilibrium axis in a tokamak K, wherein each ion species has its own natural resonance. Disposed along the equilibrium axis is at least one resonating field, electromagnetic wave, rf energy and injector J, as is understood in the art, tending to inject resonant field, rf, E.M. microwave energy into the plasma column C at the resonance frequency of one of the ion species to resonate these ions to produce ions of at least one species having a higher average energy than the average bulk target plasma particle energy along some particular trajectory, e.g. a trajectory coaxial with the plasma column equilibrium axis, such as either a trajectory having the same direction as the plasma current or the opposite direction, as understood in the art. Each injector J consists of an oscillator O, a power source s, and a transmitter W, which in this embodiment is a waveguide that is connected into the vacuum tight torus to obtain penetration of the plasma column by a resonating microwave B, whose direction is transverse to the plasma axis Z, as indicated by arrow A.

Consider a path P taken by a suprathermal plasma ion particle 13 as a result of the influence of the microwave beam B, which is orientated to exert forces on particle 13 in the following manner. It will be seen that the ion spirals around the helical field line L with a predetermined ion cyclotron frequency, which, as explained by Bishop in the cited reference, is the natural frequency of rotation of the particle in the magnetic field, in one direction (e.g., clockwise as shown by path P). Initially, the respective selected ion species or charged particle 13 has a velocity, e.g., parallel or anti-parallel to the direction of the plasma current, and an energy equal to the average bulk target plasma particle energy. However, the injected beam B is tuned to a harmonic of the specific ion-cyclotron frequency of one of the ion species of the ions the two-ion-species neutral bulk target plasma selectively to order the ions of the selected species into a higher energy state by transferring and adding stored energy to the selected ions so that the selected ions have a higher average energy than the average energy of the bulk target plasma.

It will be noted from FIG. 1, as well as the other figures, that the injected beam B, where it is shown as a dotted line as it enters the toroidal magnetic field, is normal to the equilibrium axis Z of the confined plasma column C. The injected beam, since it is electrically neutral, enters the bulk target plasma column, where it is in resonance with the selected ion species whose velocity is primarily parallel to and along the helical equipotential, magnetic lines L following a path P, whose direction is defined by arrow D in FIG. 1, with the predominant motion along the field lines.

In order to follow an accelerated ion, FIG. 1a illustrates a plasma column at three successive time intervals of a few milliseconds, which is equivalent to one bulk target plasma ion-ion collision time. Particle 13 has an initial position when the particle passes in front of the wave-guide W, where it enters the bulk target plasma, as shown in a partial three-dimensional view in FIG. 1a, and after several transits around the torus along a particular helical field line L. The first transit of the particle 13 immediately after passing the waveguide in the direction of the plasma current is identified as particle 13, while the second, third, fourth etc., transits are identified as beams 13', 13'', 13''' etc., respectively. When the particle 13 has a greater velocity and energy than the average bulk target plasma particle velocity and energy, the ion will have a suprathermal ordered energy that will cause it to disappear by fusion reactions with the bulk target plasma ions, it being noted that the particle would tend to slow down more and more during each transit due to the bulk plasma drag, but the rf injection counteracts that slowing down. The average slowing down time of the suprathermal ions is the average time it takes for these ordered ions to slow down to the average energy of the bulk plasma ions after the beam B is shut off. In the ATC at Princeton U., this is about 10 msec for a 15 keV suprathermal ordered energy ion. The average transit time of a suprathermal ordered ion is the average time it takes the ion to make one revolution around the axis of rotation Y.

Should an external energy source add energy to the resonant ion, in accordance with this invention to compensate for the plasma drag, i.e., selectively to speed up the resonant ion or to sustain its energy against the plasma drag, the slowing down time will be increased, and the transit time will be decreased to compensate for and to counterbalance the slowing down forces. This results in an increase in the fusion reactions produced by the Coulomb collisions of the resonant particles with the bulk target plasma particles. For example, instead of falling behind, the resonant ion will speed up, whereupon its fusion cross-section with the bulk target plasma ions increases.

As shown in FIG. 1, conventional electromagnetic energy sources S and injectors J are arranged to transmit their energy through the sides of the toroidal vacuum container, referred to as torus T for convenience, containing the plasma column C, and into the bulk toroidal target plasma column C. To this end, conventional sources S and wave guides W are employed, which may contain titanium dioxide X. As shown in FIG. 1, the wave guides seal the source to the torus in a vacuum tight manner, and a vacuum tight feed F from a continuously variable frequency oscillator O provides the necessary energy transverse to the outside of the plasma column. While an injector J is shown in FIG. 1, four symmetrically arranged injectors J are shown in the modification of FIG. 1b, an any number of symmetrically arranged injectors J can be used at right angles to the plasma column.

In operation, the beam B is injected from a conventional source transverse to the helical field lines in a tokamak containing a bulk neutral, two-ion-species, equilibrium plasma having a Maxwellian velocity distribution. The plasma is magnetically confined at a first density and temperature, so that the energy loss therefrom is at a first rate, and the injected beam B adds energy to balance the first rate. To this end, the injected beam B does not increase the plasma density, but it does balance the bulk plasma energy loss, since the heating supplied thereby is due to the fact that a single suprathermal particle provides the thermal energy of 10 – 100 "hot" bulk target plasma particles. Also, the suprathermal ions are classically confined as described in Princeton Plasma Physics Lab. Report MATT-1029 by Bol et al.

As soon as the resonance begins, and as long as it lasts, i.e., 10 msec in the ATC at Princeton U., the rf energy is injected at twice the ion cyclotron frequency of the one of the ion species selectively to control and increase or to sustain its suprathermal ion energy. For example, the injected rf resonant energy is increased at a harmonic of the selected ion frequency to increase the selected ion energy an amount that compensates for the slowing down of the ion due to the drag of the lower energy bulk plasma ions. This maximizes the fusion reactions of the suprathermal ions with the bulk target plasma ions.

The plasma is magnetically confined in a symmetric, circular, toroidal plasma column C in an evacuated torus T at $10^{12} - 10^{14}$ particles/cm$^3$) at an electron temperature $T_e$ of at least 1 keV. Thereupon the four high frequency sources S of FIG. 1b, which are each the same as the one shown in FIG. 1, transmit suitable electromagnetic wave energy at a suitable power and frequency into the plasma column c, e.g., through a suitable horn shaped wave guide forming an antenna that is connected to the outside of the torus T in a vacuum tight manner, whereby the high frequency electromagnetic energy from the respective sources S pass through a cut out portion forming at least one slot in the side of the torus T. This slot will be understood in the art as being of a suitable shape and size efficiently to couple the high frequency resonant energy in beam B into the plasma column C. One suitable slot shape and size for relatively low density plasmas and relatively low frequency microwaves corresponds to those provided by the Listano coil described in Princeton University Plasma Physics Lab Report MATT-Q-23 and 24.

Advantageously, the resonant rf electromagnetic energy from injectors J enter the plasma column transverse to the Z plasma column equilibrium axis at a frequency that is at the second harmonic of the ion cyclotron frequency of one of the species of the spiralling ions in the two-ion-species bulk target plasma, the ion cyclotron frequency being defined herein as the natural frequency of the ion as it spirals around the helical field lines L. While 75 MHZ is the second harmonic of the ion cyclotron frequency in the PLT at Princeton University various other tokamaks will have larger or smaller ion cyclotron frequencies around the helical field lines depending on and corresponding in direct proportion to the strength of the poloidal field created by the plasma current I and its ratio to the toroidal field strength. This ratio is determined by stability criteria described in the July 1972 Sci. Am.

In the modification shown in FIG. 1c the rf injector J is provided by an electrical conductor ring G inserted inside the torus T and around the plasma co-axial with the Z axis of the plasma. The ring G is connected to a continuously variable frequency oscillator O' and power source S' capable of the same frequencies and power as the oscillator O and power source S of FIG. 1. In the embodiment of FIG. 1c, however, the oscillator and ring resemble the ion-cyclotron resonance means of U.S. Pat. No. 3,105,618 by Stix for coupling the output energy from the ring G to the ion cyclotron resonance of one of the ion species in the two-ion-component plasma confined in the tokamak K of FIG. 1. To this end, as described in column 4 line 16 of the above-mentioned 618 patent by Stix, the ion cyclotron motions of the selected ions are well known in the art such that radio frequency (E.M.) energy in a resonating field produced by a ring around the plasma column can be transferred into these resonances of the ions spiraling around the helical field lines, as described in Eq (2) of the cited Stix patent.

In the embodiment of FIG. 1c, the stored energy induced in the selected ions by the ring G causes the ions to be excited to suprathermal ordered energies above the average energy of the bulk target plasma C with an input energy that counteracts the tendency of the plasma drag to slow the suprathermal ions down. Thereupon, the stored energy in the suprathermal ions causes these ions to react with the bulk target equilibrium ions to produce fusion reactions directly, as understood from page 659 "Controlled Thermonuclear Reactions" by Glasstone and Lovberg, 1960, from which it is known that the bombardment of a deuterium plasma from 1 - 10 keV by accelerated tritons having energy in the range of 100 – 300 keV could lead to considerable net energy gain. Likewise e.g. in the embodiment of FIG. 1c, the rf energy in ring G accelerates tritons in the two-ion-component equilibrium plasma column C in the tokamak of FIG. 1 to 100 – 300 keV so that the accelerated tritons bombard the deuterons in the neutral bulk equilibrium target plasma to produce fusion reactions directly, it being understood that the deuterons can alternately be selectively accelerated by changing the continuously variable rf frequency of the oscillator O' to their resonant frequency, e.g., a harmonic thereof.

In the modification of FIG. 2, which is a three-dimensional view of the tokamak K of FIG. 1, colliding beam neutral beam injectors N are employed to produce the required two-ion-species plasma, and the rf energy injectors of FIG.'s 1, 1b or 1c are used to maintain the injected supratermal ions produced against the slowing down effects of the bulk target plasma drag. In this embodiment, the fusion output of a two-component neutral-injected plasma can be enhanced by selective heating of the injected deuterons, a further discussion of which is provided in MATT-1113.

Typical neutral beam sources are described in U.S. A.E.C. Report WASH 1295 for the ATC and other tokamaks, and a technical description of the slowing down times is contained therein. Since the average slowing down time of the injected ions depends on the size of the injector and plasma, the pulse length of the rf injection will vary accordingly. For example, the slowing down time in the ATC at minor radius $a = 17$ cm, is about 10 msec, and so the rf source would be pulsed for 10 msec during the time, and/or after the time neutral beam was injected. For the PLT being built at Princeton, which has a minor radius of 45 cm, and the TCT, which is proposed at Princeton University with a minor radius of 120 cm, the slowing down time is up to 100 msec, in which case the rf source would be pulsed for up to 100 msec or more.

The following are examples of the external energy sources

EXAMPLE I

Four, rf, 10 MW, 75 MHZ, resonating electromagnetic energy sources transmit resonating E.M. energy through wave guides symmetrically arranged in a plane at 90° intervals around the axis of rotation of a tokamak containing a two-ion-species plasma so that one of the ion species is accelerated to suprathermal energies by the E.M. source and sustained thereby against the slowing effects of the plasma drag so as to maximize the temperature and fusion reaction rate of the suprathermal ions with the neutral bulk equilibrium plasma ions. The type of sources and wave guides of U.S. Pat. No. 3,779,864 are used. In order to have reasonable dimensions, the wave guides are filled with a material with a dielectric constant of at least 10 (e.g., titanium dioxide is used). The RF electric field is polarized perpendicularly to the toroidal magnetic field. The injected RF energy has the frequency of the second harmonic of the selected ion cyclotron frequency. The rf resonating frequency is continuously variably controlled by conventional means, as described in U.S. Pat. No. 3,052,614.

EXAMPLE II

In another example, instead of wave guides, coils are placed inside the inside wall of the vacuum vessel and energized by an rf energy source to accelerate one of the ion species contained in the tokamak of Example I. Thus, the rf is injected at the second harmonic of the ion cyclotron resonance frequency to accelerate one of the species in the bulk target plasma, with the acceleration being perpendicular to the toroidal magnetic field that confines the bulk target plasma column. The fundamental frequency is the ion cyclotron frequency of the injected ions around the helical field lines.

The ring has a total inductance that is resonated with a capacitor network by a radiofrequency voltage generator, as described in column 1 of the cited Stix patent. Thus, the current in the induction coil provided by the ring varies periodically with time and this changing current induces an electric field in the plasma. Since the frequency of the electric field is the same as the natural ion-cyclotron resonance of the selected ion species, this ion is properly excited, as desired.

EXAMPLE III

The steps and apparatus of Examples I and II are repeated with the tokamak of FIG. 2 in which neutral beams are injected to produce an ordered suprathermal ion species having a stored energy in a target bulk equilibrium plasma consisting of at least one other ion species. The system has the following system parameters:

EXAMPLE IV

The steps of Example I – III are repeated using a bulk target plasma, comprising a majority of tritons and a minority of deuterons in a magnetically confined plasma column having a charged particle density confinement time of at least $4 \times 10^{12}$ cm$^{-3}$ sec, and the rf electromagnetic energy is injected into the bulk target plasma for 40 msec at a frequency of 75 – 100 megahertz at an average energy of at least 20 megawatts to increase the energy of the deuterons, whose ion cyclotron frequency is a harmonic of the rf frequency. For example, the rf is at the second harmonic of the ion cyclotron frequency to accelerate and maintain the energy of the deuterons at a suprathermal energy of between 100 and 200 keV.

EXAMPLE V

The steps of Examples III and IV are repeated using a neutral injected beam that forms a two-component plasma with a ratio of suprathermal deuteron energy density to bulk target plasma energy density in the range of 0.2 to 1.0 so that the rf injection maximizes the heating and reaction products from a neutral beam injection that is pulsed over 10 msec.

While the above has described a tokamak for confining the plasma column, it is understood that stellarators or other closed or open devices can be used.

Also, while the above has primarily related to bombarding suprathermal ordered ions of one species having stored energy against ions of another species in a neutral bulk equilibrium plasma, it is understood that more than one species of ions can be used. For example, the neutral bulk target plasma can contain tritons and deuterons in equilibrium and injected suprathermal deuterons from a single or colliding neutral beams injected into a plasma column in a tokamak. Thereupon, the injected rf accelerates the tritons and adds stored energy thereto so that they bombard both the suprathermal and equilibrium deuterons.

This invention has the advantage that rf energy is injected into a magnetically confined two-ion-species neutral bulk target equilibrium plasma to produce and/or to sustain suprathermal ordered ions having stored energy that causes the suprathermal ions to bombard the equilibrium bulk target plasma ions to produce fusion reactions directly before the suprathermal ions thermalize by slowing down or they escape from the confined plasma column. The rf can accelerate or sustain a variety of ions species at various suprathermal energies and/or, the rf can sustain the energy of suprathermal ions in a two-ion-component plasma against the slowing down effects of plasma drag. In the case of a two-ion-component plasma having suprathermal ordered injected ions with stored energy that is produced by neutral beam injection, the rf can be injected during the neutral beam injection and for the slowing down time of the injected ions to sustain the energy of the suprathermal injected ions against plasma drag.

What is claimed is:

1. In an apparatus for sustaining the energy of ordered charged particles in a confining magnetic field, comprising:
   a. means for creating a neutral, two-ion-species, equilibrium, bulk plasma column in a closed toroidal magnetic confinement having helical magnetic field lines for confining both the ordered and equilibrium plasma particles;
   b. means containing titanium dioxide for injecting rf resonant energy into the plasma transverse to the axis of the plasma column in resonance with the natural frequency of one of the ions species; and
   c. means for injecting colliding, neutral, ordered beams having stored energy into the confined plasma particles to produce colliding, suprathermal ions whose energy and direction are ordered, opposite and confined by the helical magnetic field lines, and
   d. said rf energy is injected to sustain the energy of the colliding beams against plasma drag.

* * * * *